Dec. 1, 1964   J. M. HAGGARD ETAL   3,159,139
LIVESTOCK APPARATUS
Filed Oct. 30, 1961   6 Sheets-Sheet 1
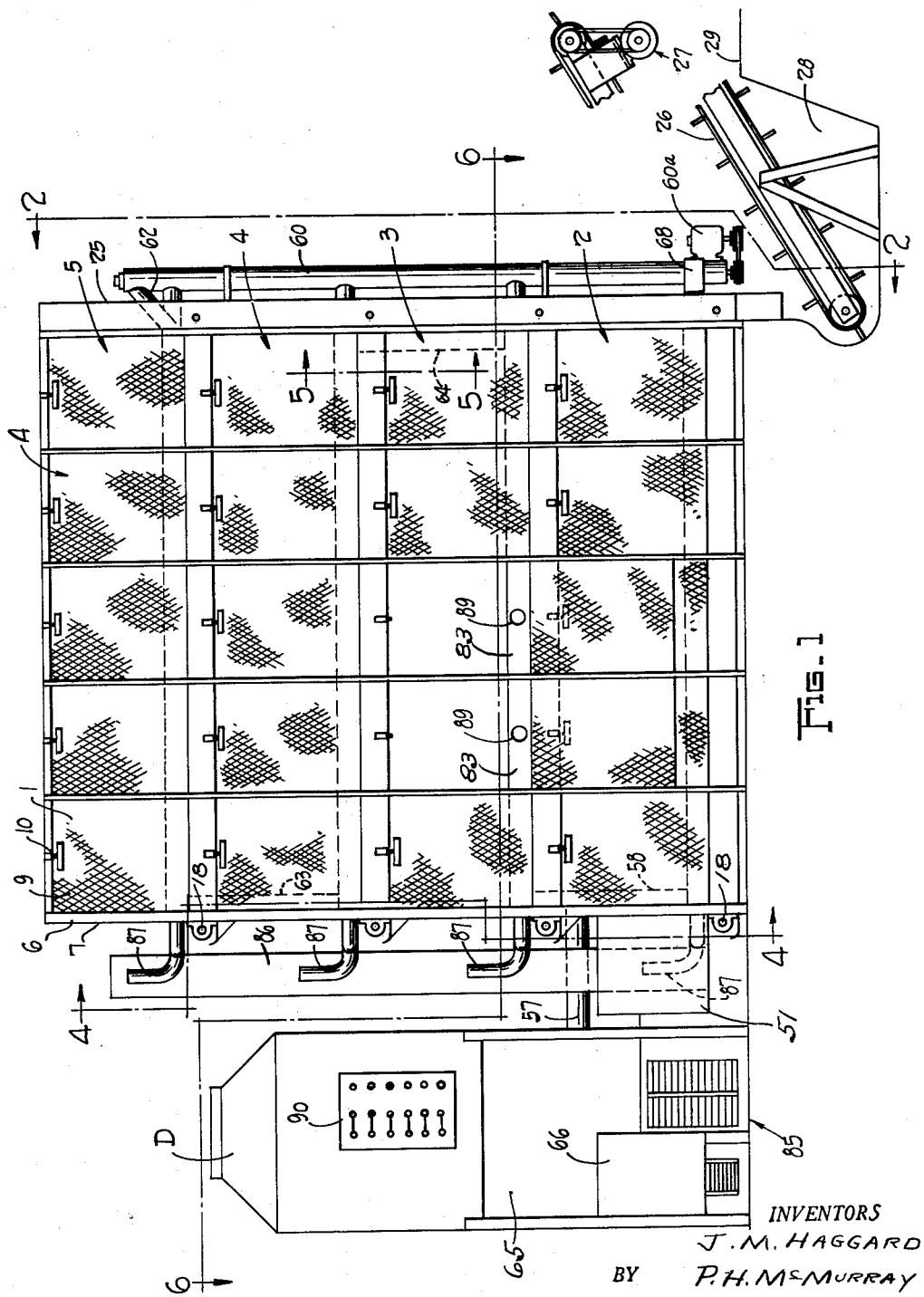
INVENTORS
J. M. HAGGARD
P. H. McMURRAY
BY Robb + Robb
attorneys Dec. 1, 1964   J. M. HAGGARD ETAL   3,159,139
LIVESTOCK APPARATUS
Filed Oct. 30, 1961   6 Sheets-Sheet 2
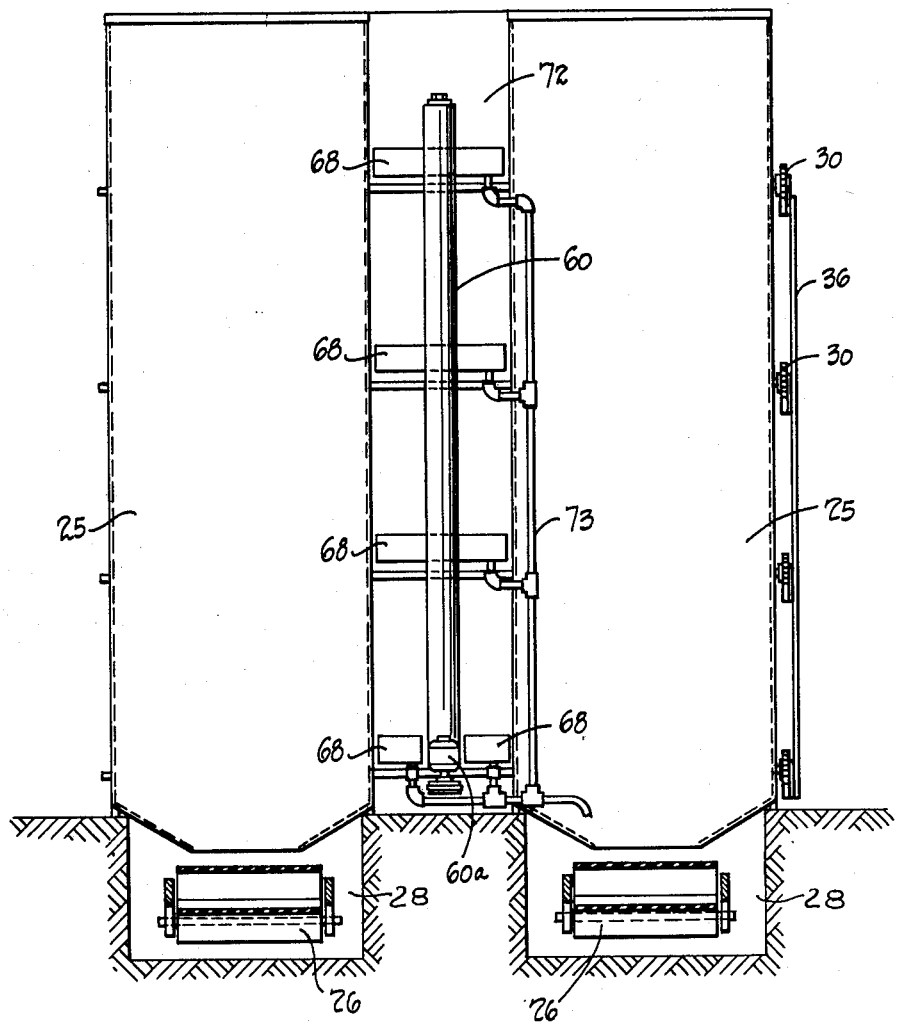
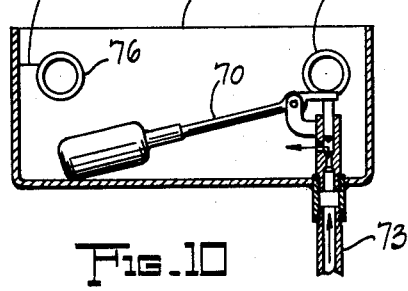
INVENTORS
J. M. HAGGARD
BY P. H. McMURRAY Dec. 1, 1964  J. M. HAGGARD ETAL  3,159,139
LIVESTOCK APPARATUS
Filed Oct. 30, 1961  6 Sheets-Sheet 3

INVENTORS
J. M. HAGGARD
BY P. H. McMURRAY
Robb + Robb
attorneys

Dec. 1, 1964     J. M. HAGGARD ETAL     3,159,139
LIVESTOCK APPARATUS
Filed Oct. 30, 1961     6 Sheets-Sheet 4
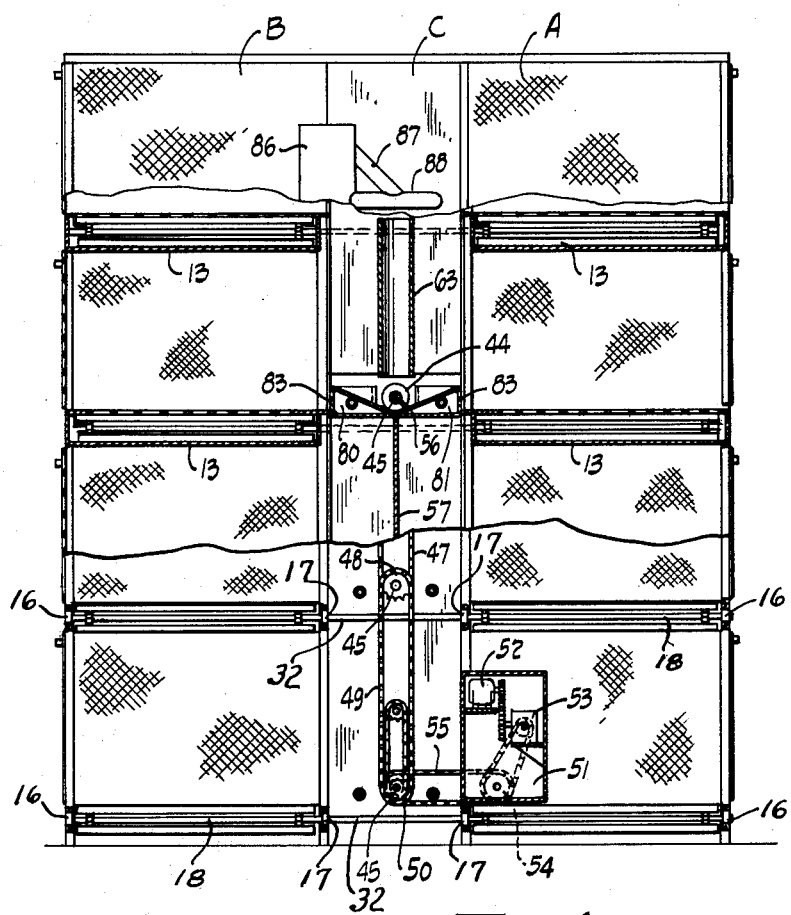
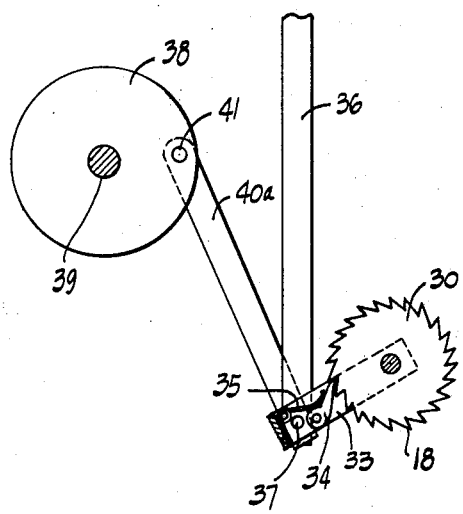
INVENTORS
J. M. HAGGARD
P. H. McMURRAY
BY Dec. 1, 1964    J. M. HAGGARD ETAL    3,159,139
LIVESTOCK APPARATUS
Filed Oct. 30, 1961    6 Sheets-Sheet 5

INVENTORS
J. M. HAGGARD
P. H. McMURRAY
BY Robb+Robb
Attorneys

INVENTOR.
J. M. HAGGARD
P. H. McMURRAY
BY Andrus & Starke
Attorneys

United States Patent Office 3,159,139
Patented Dec. 1, 1964

3,159,139
LIVESTOCK APPARATUS
John M. Haggard and Paul H. McMurray, Delphi, Ind.
Filed Oct. 30, 1961, Ser. No. 167,989
(Filed under Rule 47(a) and 35 U.S.C. 116)
8 Claims. (Cl. 119—17)

This invention relates to an apparatus for developing animals under mechanically controlled environmental conditions. The apparatus of this invention is advantageous in the raising of livestock and in particular, hogs.

This is a continuation-in-part of the prior copending application Serial Number 717,078, filed February 24, 1958, of the same applicant, and now abandoned.

Animals raised according to this invention are retained in confining pens or cages commencing generally at the weaning stage and continuing until the animals have reached marketable proportions. The pens are designed to limit the movement and activity of the animal or animals confined therein to minimize muscular toughening while at the same time mechanically providing a readily accessible supply of feed, water and conditioned air to the penned animals. The pen construction also acts to keep the animals out of contact with the ground to prevent them from ground feeding and to reduce the disease potential inherent in such feeding.

Each pen is mechanically provided with a continuous supply of water. The animal or animals confined in the pen, therefore, have ready access to a continuous supply of water.

Feed is automatically delivered to each of the pens through a series of conduits which extend from a central feed storage area to the pens. Feed which is not consumed by the penned animals is automatically returned to a main feed conduit adjacent the central feed storage area.

Conditioned air automatically maintained at certain temperature levels is efficiently supplied to the penned animals to facilitate their rapid healthy development to marketable proportions. In the case of an animal such as a hog where it is known that the animal's body heat can be best controlled by controlling the temperature and moisture content of the air it inhales, the conditioned air is furnished in a manner such that the animal may avail itself of the air by introducing its snout directly into the air supply channel. This is efficiently accomplished by providing a conduit adjacent the confining pens through which conditioned air may be supplied. The conduit is provided with one or more openings in communication with each pen. A hinged pressure sensitive door is placed over each opening to prevent the escape of conditioned air when not being respired by the confined animals. When the animal begins to sense the discomfort of the surrounding atmosphere, he will push the door aside with his snout and insert it into the conduit and stream of conditioned air thereby promoting maintenance of optimum body temperatures.

Waste removal from the pens is accomplished automatically. Waste is, therefore, removed as it is developed or at predetermined intervals. This gives rise to a relatively high degree of pen sanitation with a consequent reduction in disease.

Various objects and advantages of the invention will hereinafter become more fully apparent from the following description of the drawings illustrating presently preferred embodiments thereof, and wherein;

FIGURE 1 is a side elevational view of the animal raising apparatus of the invention;

FIG. 2 is an end view of FIGURE 1 taken on line 2—2;

FIG. 4 is a sectional view taken about on line 4—4 of FIGURE 1;

FIG. 9 is an enlarged fragmentary view taken on line 9—9 of FIG. 6;

FIG. 10 is an enlarged fragmentary sectional view taken on line 10—10 of FIG. 6.

Figure 3:
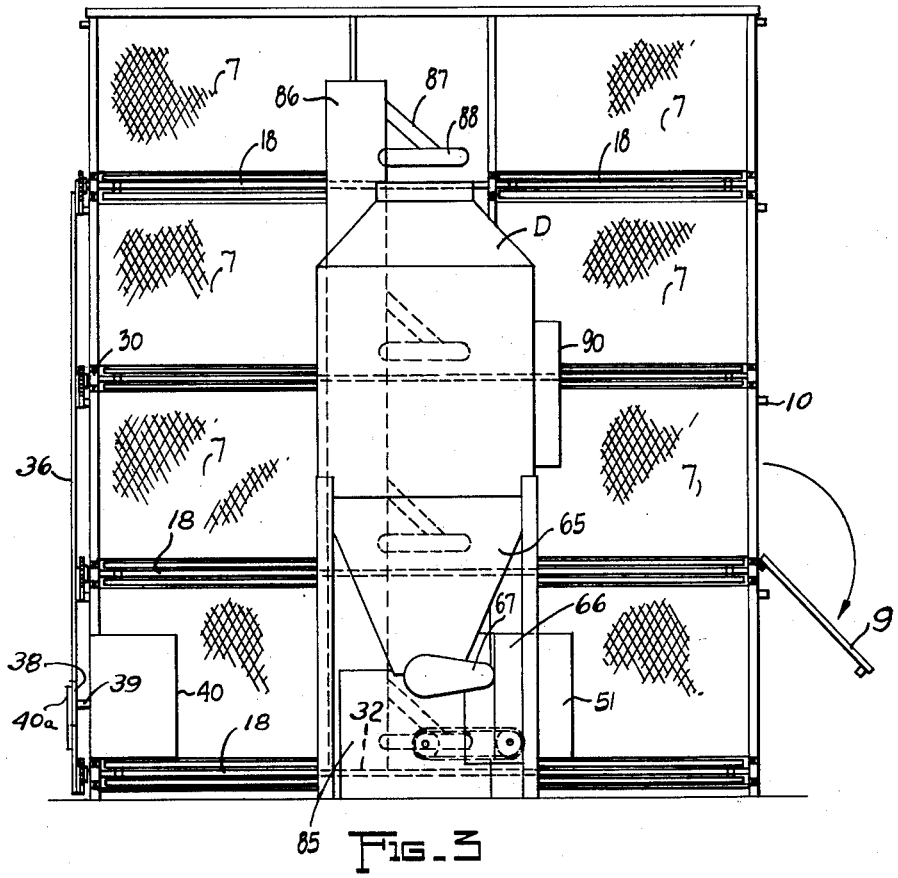
FIG. 3 is an end view of FIGURE 1 taken at the end opposite that of FIG. 2.

The apparatus of this invention comprises a series of pens, each pen 1 being substantially identical to the others. The series of pens is divided into two spaced sections A and B. A central section C which provides coextensive facilities for feeding, watering and supplying conditioned air to the animals in the respective pens is disposed between sections A and B. Each section is composed of four layers or tiers. The bottom tier is designated generally 2, the second tier 3, the third tier 4, and the fourth tier 5.

Each of the tiers is substantially identical to the others. The entire apparatus is supported by a rigid frame 6. The pens 1 have foraminated sides 7, floors 8, and swinging doors 9.

Each of the pens 1 is designed to provide space sufficient to confine one or more animals, in this instance hogs, from the time they are weaned until they reach marketable proportions. As may be best viewed in FIG. 3, the doors 9 of each cage swing downwardly upon hinged lower edges and are latched by latch means 10 at the top of the cage 1 and door 9.

Figure 5:
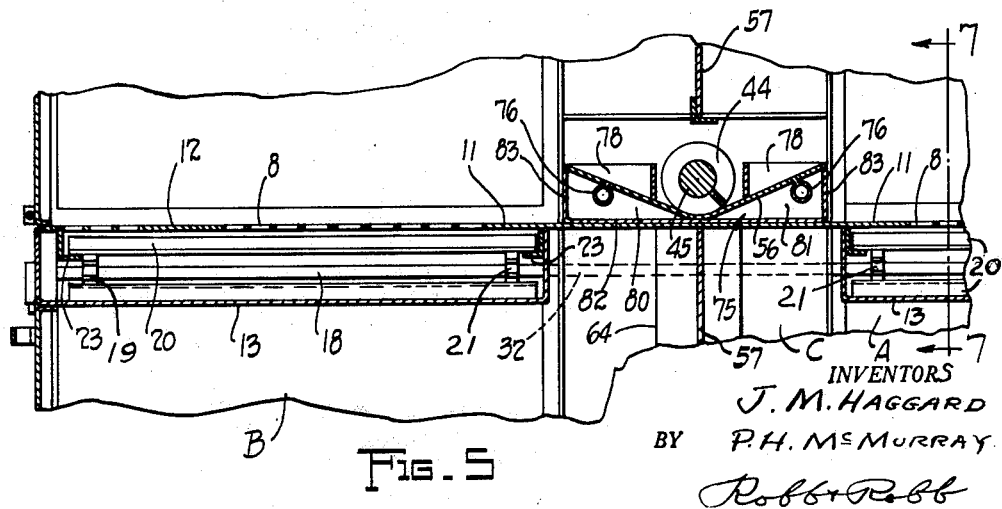
FIG. 5 is an enlarged fragmentary sectional view taken on line 5—5 of FIGURE 1.

It may be desirable in some instances to provide flat uninterrupted surfaces 11 and 12, as may be seen in FIG. 5, in the floor 8 of each pen in order to afford the hog confined in the pen a flat uninterrupted surface for both fore and hind feet.

The foraminated floor construction of the pens provides means whereby manure will gravitate through the floor and onto a solid surface 13 which extends from end to end of each of the pen sections beneath each tier of pens.

In order to remove manure which has fallen through the foraminated pen floors 8 and onto surface 13, each tier of each pen section is provided with an endless chain driven scraping device. This scraping device includes a pair of sprockets 14 and 15 at one end of a section of pens and a second pair at the other end. Each pair of sprockets 14 and 15 is joined by a shaft 18 which extends laterally beneath the pen section and through the sprockets and is supported at each end by pillow blocks 16 and 17 respectively. An endless chain 19 extending longitudinally of the pen section joins the sprockets 14 at each end of the pen section and another similar chain 21 joins the sprockets 15. A series of scraper bars 20 which extend laterally beneath the pen section are attached at intervals along chains 19 and 21.

Figure 6:
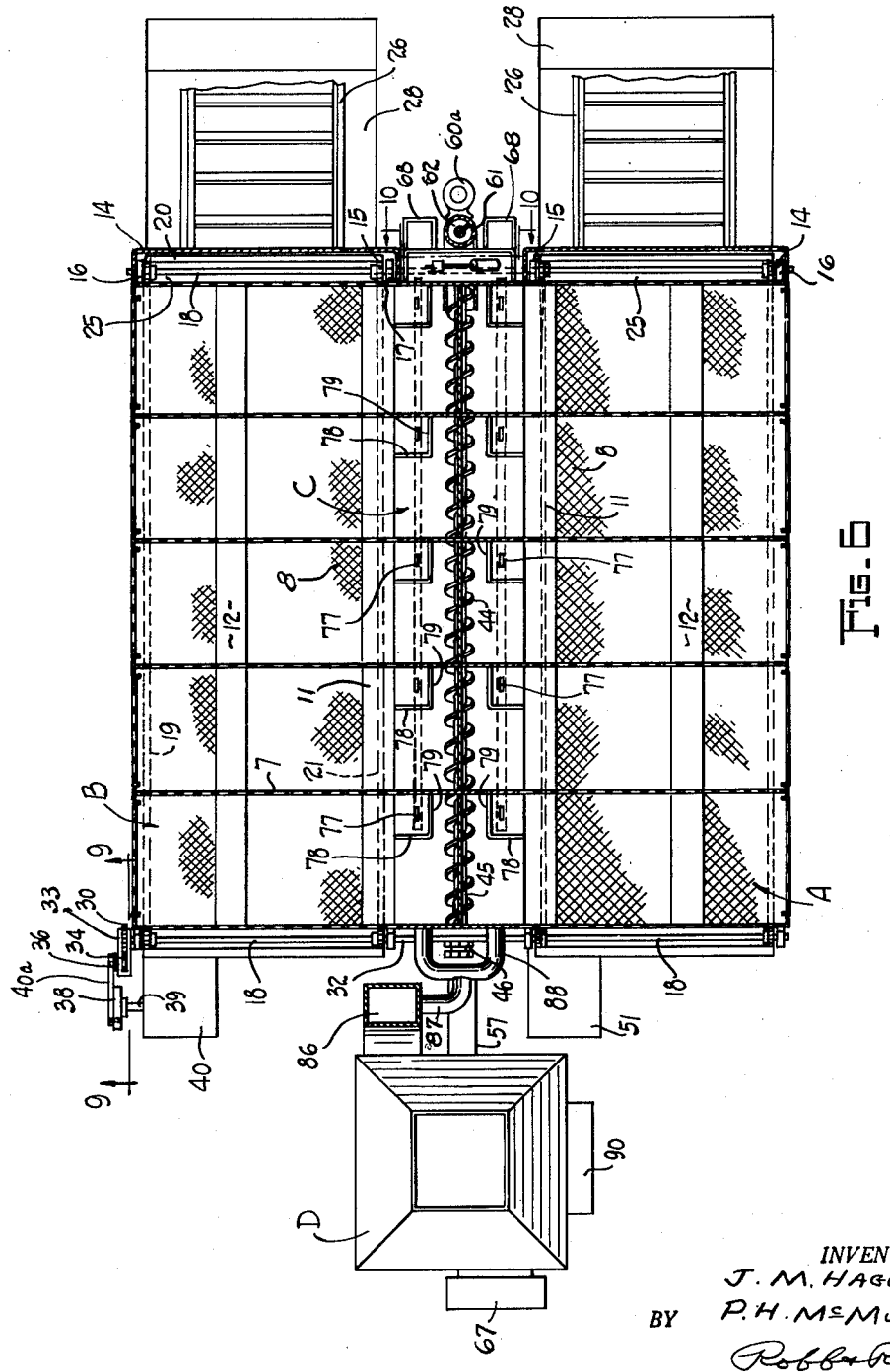
FIG. 6 is a transverse sectional view taken on line 6—6 of FIGURE 1.
Figure 7:
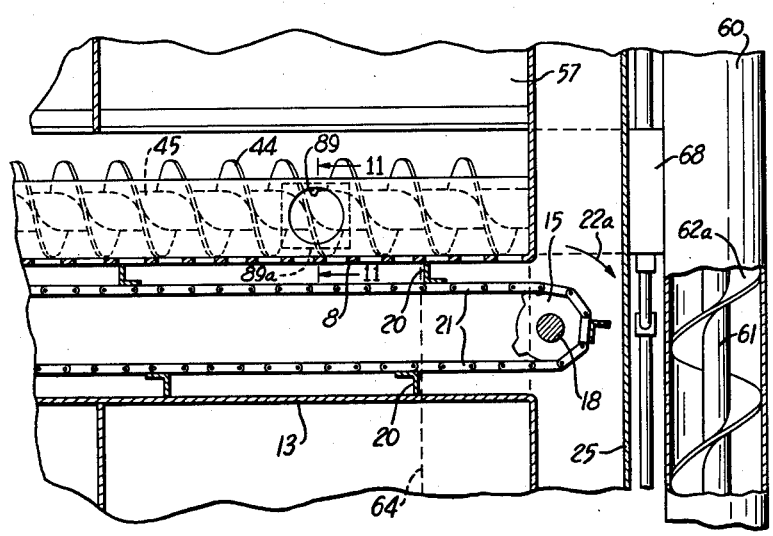
FIG. 7 is an enlarged fragmentary sectional view taken on line 7—7 of FIG. 5.

When the shafts 18 are driven, the scraper bars 20 will be carried by the chains 19 and 21 along the manure bearing surface 13. The scraper bars 20 will move the manure along surface 13 toward one end of the pen section. As is shown in FIGS. 6 and 7, the manure is carried to the right hand end of the pen section as the chains 19 and 21 move in the direction of the arrow 22a in FIG. 7.

The scraper bars 20 are supported during their movement over the upper lap of the chains 19 and 21 by longitudinally extending channel members 23 which are attached to the front and rear extremities of each pen area so that the ends of the bars 20 are supported during travel on the upper lap and thereby prevent chains 19 and 21 from sagging.

The manure which is deposited on surface 13 and carried by the scraper bars 20 to the end of the section of pens is discharged into a vertically extending chute 25. One of these chutes is provided for each section of stacked pens.

The manure drops down chute 25 to a conveyor unit designated 26. One of these conveyor units is provided for each chute. The conveyor unit is operated by a motor 27. The lower end of the covneyor 26 is disposed in a pit 28 which extends below the ground level, indicated at 29. The conveyor unit acts to carry the manure accumulating at the base of chute 25 to a point remote from the pens.

The operating means for the manure removal mechanism comprises a sprocket and lever elements generally shown in FIG. 3 and in more detail in FIG. 9. A sprocket 30 is mounted on each of the shafts 18 as is shown in FIG. 6. The shafts 18 of section B of the apparatus are connected with those of section A by a continuation 32 whereby the shafts of each of the sections are simultaneously actuated.

Each of the ratchet gears or sprockets 30 is provided with a yoke 33 which is pivotally mounted on the shaft 18 in yoke 33 which encloses a latch or dog 34 which is maintained in resilient engagement with the teeth of the ratchet gear or sprocket 30 by means of a spring 35. As yoke 33 is moved in a clockwise direction, the dog 34 will cause the ratchet gear 30 to move in a similar direction, whereas return of the yoke 33 in a counterclockwise direction will not affect the ratchet gear. Each ratchet gear 30 on each section layer is fastened to the shaft 18 to rotate the same thereby carrying the chains 19 and 21 around the sprockets 14 and 15.

To facilitate operation of each of these manure removal chain and sprocket units, the units are connected together by a vertically extending rod 36, which is pivotally fastened at 37 to each of the yokes 33 and thereby effects simultaneous action of each unit. In order to move the member 36 upwardly and downwardly, an eccentric member 38 is provided mounted on a shaft 39 which extends from a power unit 40, the shaft 39 being designed to cause rotation of the eccentric member 38 at a uniform rate of speed and fairly slowly so that no great wear or rapid movement of the scrapers 20 is effected.

To connect the eccentric 38 with the yoke 33, a suitable arm 40a is provided which is connected at the pivot 37 and to a pivot point 41 on the eccentric 38. By rotation of the eccentric 38, the member 36 will be caused to move upwardly and downwardly and thereby simultaneously move the yokes 33 for each of the manure removal devices. Each of the sections A and B which include such devices will be simultaneously actuated by the connection of each shaft 18 by the continuation 32.

The central section C is accessible to the animals in each pen in each of the tiers of outer sections A and B. The central section provides a common feeding source which is in the nature of a screw feeding device. The screw 44 of the feeding device extends the length of the central section. As may best be seen in FIG. 5, the screw 44 is mounted so as to be driven by a shaft 45, the shaft being supported at each end of the unit and being driven from the left hand end, as viewed in FIG. 6, by means of a sprocket 46 attached to the said shaft. A chain 47 extends from sprocket 46 downwardly to a second sprocket 48 mounted on a shaft 45 of the screw conveyor 44 of the next lower level. A sprocket similar to sprocket 48 is also fastened to shaft 45 and a chain 49 extends downwardly to a lowermost sprocket 50 mounted on the lowermost shaft 45 of the screw 44 for that layer. This sprocket chain arrangement is repeated for each layer of pens whereby the screws 44 of each of the layers in the central section C are moved simultaneously.

A power source 51 comprising a motor 52 which drives a gear reducer 53 and by means of suitable chains and sprockets indicated at 54 in turn drives the lowermost sprocket 50 by means of chain 55 at any predetermined rate.

The screw 44 is disposed to move in a trough-like member 56, as seen in FIGURE 5. A trough-like member 56 provides a central portion for support of the feed. The feed is accessible from pens of both sections A and B. The pens of each section are separated by a central curtain wall 57 extending downwardly therebetween to a point spaced slightly above the uppermost extremity of the screw 44.

Figure 8:
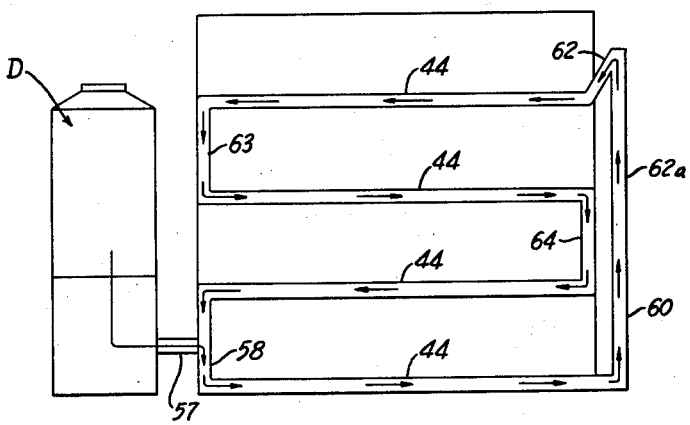
FIG. 8 is a diagrammatic view of the animal raising device of the apparatus of the invention illustrating feed flow.

The screws 44 are intended to move the feed in a circulatory path as is shown in FIG. 8. As will be seen in the several figures, a storage bin D is provided which has an outlet at the bottom thereof and in which a screw member can operate through a conduit 57 to move the feed out of the bin D and into a chute 58. Chute 58 conveys the feed into communication with the screw 44 in the lowermost level. Screw 44 then carries the feed toward the right hand end of the unit.

At the right hand end of the section C, the feed is picked up by a vertically extending screw conveyor 60, which includes a shaft 61 upon which is mounted the flight 62a of the conveyor 60. The feed is elevated by the conveyor 60 to its uppermost extent and is caused to flow downwardly in chute 62. The feed is then picked up by the uppermost screw conveyor 44 and moved toward the left hand end of the central section C.

At the left hand end of the uppermost screw conveyor 44, a chute 63 is provided which receives the feed and deposits the same in the next lower level where it is picked up by the screw of that level and moved toward the right hand end of that as level as is shown in FIG. 8. The feed remaining at the right hand end of this level is dropped downwardly in chute 63 and is picked up by the screw conveyor unit in the next lower level where it is again moved toward the left as shown in FIG. 8. At this point, the feed remaining is returned to chute 58 where it is mixed with and mingled with the feed being supplied from the bin D and is recirculated in the conveyor system.

A restricted section 65 is provided in bin D which contains drive means for the screw within conduit 57. A drive mechanism is disposed in a housing 66 and is driven through reducing means in the enclosure 67.

Hogs in the pens of sections A and B at opposite sides of the central section C will have access to the feed as it is moved by the several screws 44. The screws cause a certain amount of feed to be deposited in each of the pockets adjacent the screws. The hogs on each side of the central section will, therefore, have ready access to an ample supply of feed.

Watering facilities which are coextensive with the feed instrumentalities are provided for the penned animals by the central section. The right hand end of central section C is equipped with a series of tanks 68, there being one tank for each pen tier. As illustrated in FIG. 10, each tank contains a valve unit 70 for regulation of in-flow of water and supply to each pen. The valve 70 may be of the float control type so that when the level reaches a point such as that indicated at 71, the valve will be closed and prevent water from overflowing. It should be noted that the lowermost pen layer is provided with a pair of tanks, which extend from the wall 72 as do the single tanks of the other pen layers. This is necessitated by the location of unit 60 which prevents any other manner of mounting. The tanks 68 at the lowermost level are identical to the other tanks 68, as illustrated in FIG. 10. A water supply pipe 73 carries water from a source not shown to the tanks of each pen layer.

As may be best seen in FIG. 5, a trough-like unit 75 extends from tanks 68 of each pen layer and includes the trough 56 and tubes 76. The tubes 76, as illustrated in FIG. 6, are equipped with slots 77, one of which opens into each pen. The slots 77 continuously provide water to a pan-like part formed by the member 78 and the member 79. As the water is removed from the pans formed by the members 78 and 79, fresh water supplied through the tubes 76 will continuously replenish the pans provided for by the valves 70.

The trough-like structure 75 in essence provides parallel conduits 80 and 81 which are coextensive with the feeding and watering instrumentalities. Conduits 80 and 81 are generally defined by bottom surface 82 and vertical side surfaces 83.

The lower portion of bin D is equipped with an air conditioning unit 85. This unit acts to supply conditioned air to the penned animals. The air supplied to the animals is automatically regulated by the unit 85 and conditioned according to the atmospheric environment surrounding the pens.

Figure 11:
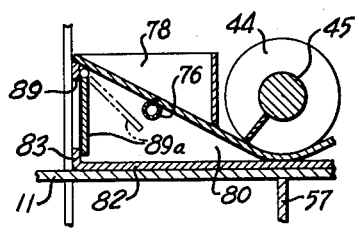
FIG. 11 is an enlarged fragmentary sectional view taken on line 11—11 of FIG. 7.

Conditioned air is carried to the pens through a manifold 86 which extends vertically from the unit 85. At each pen level, a take-off conduit 87 is connected to manifold 86. The take-off conduits 80 and 81 of the corresponding level are fed by the generally U-shaped conduits 88. Conditioned air may flow from the air conditioning unit 85 into manifold 86 and finally via conduits 87, 88, 80 and 81 into the central section C adjacent the pens of sections A and B. Each of the conduits 80 and 81 is provided with a series of openings 89 in the walls 83 which are in communication with the pens of each tier. Each pen may be provided with one or more of such openings depending on the number of animals to be confined therein. To provide for the efficient operation of the air conditioning system, a flap 89a, as may best be seen in FIG. 11, is hinged to the inside surface of wall 83 and acts to cover opening 89.

The pressure of the conditioned air in conduit 80 and 81 is sufficient to hold the flap 89a against the opening 89 and thereby avert substantial losses of conditioned air when such is not required by the penned animals. When the confined animal senses discomfort due to the surrounding atmosphere, he may proceed to push flap 89a open with his snout and to insert his snout into either conduit 80 or 81. The animal may then respire conditioned air directly from the conduit and thereby materially assist in controlling his body temperature and in providing for his maximum comfort. When the animal chooses to withdraw his snout from the conduit, the flap 89a again acts to cover the opening and to thereby reduce the loss of conditioned air.

The arrangement of the water supply tubes 76 within the conduits 80 and 81 is advantageous in aiding in the maintenance by the conditioned air of a water temperature close to that of the conditioned air.

The operation of the various devices described above is coordinated by a central control panel 90 which is mounted upon bin D. The panel 90 may include timing and temperature sensing mechanisms to regulate and coordinate the various operations carried out by this animal raising apparatus. In this manner feed may be delivered to the pens at desired intervals, animal waste may be removed at timed intervals, and conditioned air may be supplied as the temperature in the area of the pens varies from the optimum growth temperature of the animals confined.

The present invention therefore provides an apparatus for confining a number of animals for a period of time. During the period of confinement, the animals are automatically provided with feed, water, and conditioned air at predetermined optimum growth rates. Waste developed by the animals is automatically removed. This combination aids in the rapid development of the confined animals under relatively sanitary conditions.

Various modes of carrying out the invention are contemplated as being within the scope of the following claims particularly pointing out and distinctly claiming the subject matter which is regarded as the invention.

We claim:

1. An animal enclosure comprising, animal confining means, conditioned air containing means disposed in proximate relation to the confining means, means defining an opening in the containing means opening into the interior of the confining means and adapted to receive the snout of an animal confined by the confining means, and animal body actuated pressure responsive means covering the opening provided by the opening defining means whereby a confined animal may force his snout into contact with and open the pressure responsive means to gain access to the conditioned air of the containing means and may thereby respire conditioned air directly from the containing means.

2. An animal raising enclosure comprising, a plurality of animal confining pens, means associated with the confining pens for supplying feed to the animals confined therein, means for providing water to the animals confined by the confining pens, manure removal means operatively associated with the confining pens, a conduit containing conditioned air associated with each of the confining pens and having a plurality of openings with each opening being accessible to the snout of an animal confined in a confining pen and being adapted to receive the snout of an animal confined therein, and animal body actuated pressure responsive closure means covering the openings of the conduit whereby confined animals may force the closures open with their snouts and may introduce their snouts into the conduit and into communication with the conditioned air and may thereby respire conditioned air directly from the conduit.

3. An animal raising unit comprising, a plurality of stationary animal confining pens arranged in a pair of spaced rows, a central feed carrying section disposed between and connecting the spaced rows of pens, each of the pens being in communication with the central feed carrying section, a continuous conveying means disposed in the central feed carrying section and adapted to carry feed adjacent to the pens of each of the rows, the continuous feed conveying means including feed return means whereby unconsumed feed portions may be recirculated to the confining pens, a water supply conduit disposed within the central section and provided with a plurality of openings, each opening of the conduit being disposed in proximate relationship with a confining pen of a row, each confining pen being provided with a container disposed in communication with the conduit and adapted to receive water therefrom, and an air conditioning conduit disposed adjacent to each row of confining pens, the air conditioning conduits have a plurality of animal accessible openings opening into the confining pens of each row, each air conditioning conduit opening being accessible to the snout of an animal confined therein, the animal accessible air conditioning conduit openings having means for receiving the snouts of animals confined in the confining pens whereby the animals may introduce their snouts into the conduit and may thereby respire conditioned air directly from the conduit.

4. The animal raising unit of claim 3 wherein the continuous feed conveying means, the water supply conduit and the conditioned air conduit are disposed in coextensive relationship adjacent the confining pens.

5. The animal raising unit of claim 4 wherein the plurality of sections of animal confining pens includes tiered sections.

6. An animal raising unit comprising, a plurality of animal confining pens having floors and sidewalls, an elongated air conditioning duct disposed adjacent the confining pens, the duct being provided with a plurality of openings adapted to receive the snouts of individual confined animals and at least one of which opens into the sidewall of each of the confining pens, the duct opening in the sidewall of a confining pen being spaced above the floor of the pen, animal body actuated pressure responsive closure means covering the duct openings whereby a confined animal may thrust his snout against the closure thereby gaining entrance into the air conditioning duct and may respire conditioned air directly from the duct, and means for continuously supplying the duct with conditioned air.

7. An animal enclosure comprising, animal confining means, conditioned air containing means disposed adjacent the confining means, and having an opening adapted to receive the snout of an animal confined by the confining means, an animal body actuated pressure responsive flap pivotally mounted within the conditioned air containing means and substantially covering the opening therein whereby an animal confined by the confining means may thrust his snout against the flap, thereby pushing it aside, and gain entrance to the conditioned air containing means and may respire conditioned air directly from the containing means and upon withdrawal from the containing means air is effectively retained therein by the pressure responsive flap.

8. An animal raising apparatus comprising, a plurality of stationary animal confining pens arranged in a plurality of tiered sections and having floors at least a portion of which are porous, means for supplying feed to the pens, means for providing the pens with water, waste collecting means disposed beneath each tier of pens to collect waste matter developed in the pens and gravitating therefrom to the collecting means, scraping means operably associated with the waste collecting means of each tier, common drive means for the scraping means of tiers of sections at the same level, means for simultaneously driving the common drive means of each tier, the scraping means acting to move the waste of the tiers of the sections from beneath the pens to a common end where the waste material is permitted to gravitate, and conveyor means for removing the waste material which has gravitated from the tiers to an area remote from the confining pens.

References Cited in the file of this patent

UNITED STATES PATENTS

| | | |
|---|---|---|
| 1,309,090 | Hensen | July 8, 1919 |
| 2,311,640 | Cornell | Feb. 23, 1943 |
| 2,358,000 | Cornell | Sept. 12, 1944 |
| 2,764,960 | Ferris | Oct. 2, 1956 |
| 2,897,954 | Cordis | Aug. 4, 1959 |
| 3,002,494 | Murray | Oct. 3, 1961 |
| 3,042,000 | McMurray et al. | July 3, 1962 |